United States Patent
Murari et al.

[11] Patent Number: 6,134,088
[45] Date of Patent: Oct. 17, 2000

[54] ELECTROMAGNETIC HEAD WITH MAGNETORESISTIVE MEANS CONNECTED TO A MAGNETIC CORE

[75] Inventors: Bruno Murari, Monza; Benedetto Vigna, Potenza; Paolo Ferrari, Gallarate, all of Italy

[73] Assignee: STMicroelectronics S.r.l., Agrate Brianza, Italy

[21] Appl. No.: 09/109,117

[22] Filed: Jul. 2, 1998

[30] Foreign Application Priority Data

Jul. 4, 1997 [EP] European Pat. Off. .............. 97830337

[51] Int. Cl.⁷ ..................................................... G11B 5/33
[52] U.S. Cl. ......................................... 360/318.1; 360/322
[58] Field of Search .................................. 360/119, 121, 360/126, 113, 318, 318.1, 322

[56] References Cited

U.S. PATENT DOCUMENTS

| | | | |
|---|---|---|---|
| 3,881,191 | 4/1975 | Potter et al. | 360/121 |
| 3,921,217 | 11/1975 | Thompson | 360/113 |
| 4,438,470 | 3/1984 | Sawada et al. | 360/113 |
| 4,626,946 | 12/1986 | Vinal | 360/113 |
| 4,737,873 | 4/1988 | Desserre | 360/121 |
| 4,754,354 | 6/1988 | Jeffers | 360/113 |
| 4,782,415 | 11/1988 | Vinal | 360/113 |
| 4,837,924 | 6/1989 | Lazzari | 29/603 |
| 4,901,177 | 2/1990 | Lazzari | 360/113 |
| 5,103,553 | 4/1992 | Mallary | 29/603.13 |
| 5,208,716 | 5/1993 | Lazzari | 360/113 |
| 5,434,733 | 7/1995 | Hesterman et al. | 360/113 |
| 5,436,779 | 7/1995 | Valstyn | 360/113 |
| 5,648,884 | 7/1997 | Lazzari | 360/113 |
| 5,673,163 | 9/1997 | Cohen | 360/126 |
| 5,821,517 | 10/1998 | Fedeli et al. | 235/449 |

FOREIGN PATENT DOCUMENTS

| | | |
|---|---|---|
| 0475397 | 3/1992 | European Pat. Off. . |
| 51150315 | 12/1976 | Japan . |
| 55-142412 | 11/1980 | Japan . |
| 59077618 | 5/1984 | Japan . |
| 62006420 | 1/1987 | Japan . |
| 62006421 | 1/1987 | Japan . |
| 62006422 | 1/1987 | Japan . |
| 62137712 | 6/1987 | Japan . |
| 63052314 | 3/1988 | Japan . |
| 02128313 | 5/1990 | Japan . |
| 03286413 | 12/1991 | Japan . |
| 2 162 359 | 1/1986 | United Kingdom . |

*Primary Examiner*—Brian E. Miller
*Attorney, Agent, or Firm*—Theodore E. Galanthay; E. Russell Tarleton; Seed IP Law Group, PLLC

[57] ABSTRACT

An electromagnetic head for a storage device comprises a magnetic core forming a magnetic circuit, and a magnetoresistive means. The magnetic core is interrupted by an air-gap, thereby separating a first pole and second pole of the magnetic core. The magnetoresistive means is disposed in the region of the air-gap, and is connected to the magnetic core so as to be connected in the magnetic circuit.

8 Claims, 5 Drawing Sheets

ELECTROMAGNETIC HEAD WITH MAGNETORESISTIVE MEANS CONNECTED TO A MAGNETIC CORE

TECHNICAL FIELD

The present invention relates to an electromagnetic head for a storage device and, in particular, to an electromagnetic head with a magnetic core having a magnetoresistive element adjacent to an air gap.

BACKGROUND OF THE INVENTION

In magnetic storage devices such as, for example, a hard disk, the data is stored on an active surface covered with a ferromagnetic material and divided into a plurality of cells. Each cell stores one bit of data represented by a change in the magnetization state of the ferromagnetic material.

Data is read from and written on the disk by means of a head, typically an electromagnetic head. In particular, the electromagnetic head comprises a magnetic core interrupted by an air-gap disposed close to the active surface of the disk. The core defines a magnetic circuit for a flux generated by a coil wound around the magnetic core. During a writing operation, a certain current flows in the coil and the corresponding magnetic flux is linked with an underlying memory cell so as to vary its magnetization state.

The electromagnetic head also comprises a magnetoresistive element such as, for example, a transverse magnetoresistor, the resistance of which varies as a function of an external magnetic field. During a reading operation, the change in magnetic flux generated by the underlying memory cell is linked partially by the magnetoresistor. The magnetization state of the underlying cell can thus be determined by measurement of the resistance of the magnetoresistor.

The magnetoresistor is generally disposed beneath the air-gap of the magnetic core as described, for example, in WO 96/08814. In a different known structure, described in U.S. Pat. No. 4,901,177, the magnetic core is interrupted by two further air-gaps, adjacent each of which a magnetoresistor is disposed. In known electromagnetic heads, the magnetoresistor is in any case electrically insulated from the magnetic core.

A disadvantage of these known solutions is that the electromagnetic head has low sensitivity since the change in magnetic flux generated by the memory cell is not completely linked by the magnetoresistor.

SUMMARY OF THE INVENTION

An object of the present invention is to prevent the aforementioned disadvantages. In one embodiment, an electromagnetic head in accordance with the invention includes a magnetic core and a magnetoresistive means. The magnetic core is interrupted by an air-gap, thereby separating a first pole and second pole of the magnetic core. The magnetoresistive means are disposed in the region of the air-gap, and are connected to the magnetic core so as to be connected in the magnetic circuit.

The electromagnetic head according to the present invention has greater sensitivity since the change in magnetic flux generated by the memory cell and conveyed in the magnetic core is linked in an optimal manner by the magnetoresistive reading means. The structure of the present invention also simplifies the process for producing the head and, in particular, enables larger magnetoresistive means to be used.

BRIEF DESCRIPTION OF THE DRAWINGS

Further characteristics and advantages of the electromagnetic head according to the present invention will become clear from the following description of a preferred embodiment thereof, given by way of non-limiting example, with reference to the appended drawings.

DETAILED DESCRIPTION OF THE INVENTION

Figure 1:
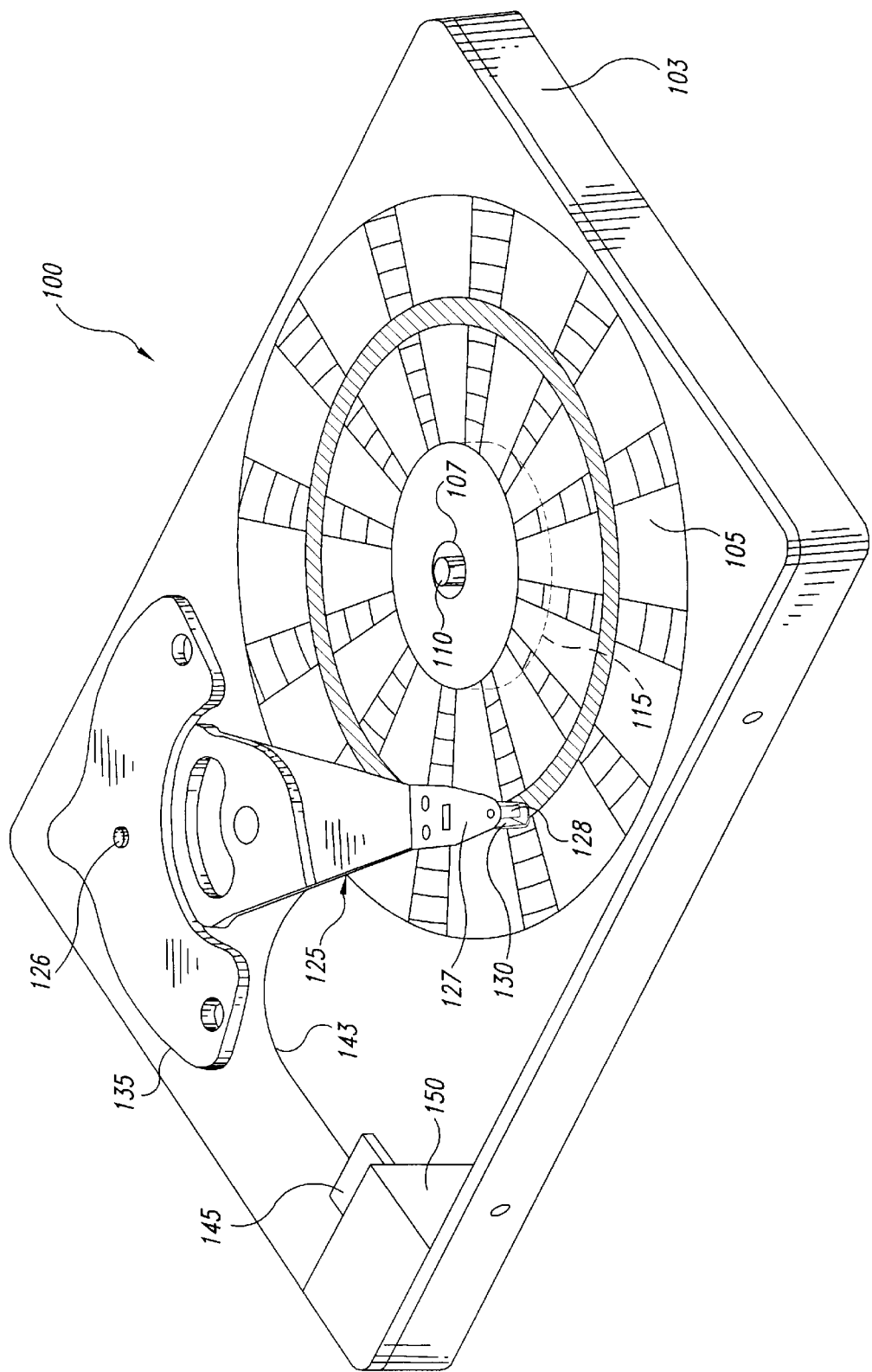
FIG. 1 shows, schematically and in section, a hard-disk storage device in which the electromagnetic head of the present invention can be used.

With reference to FIG. 1 in particular, a hard-disk storage device 100 includes a sealed container 103, inside which there is a disk 105 constituted by a rigid circular support covered with a ferromagnetic material. The electromagnetic head of the present invention is, however, also suitable for use in a multiple-disk, floppy-disk, tape or other storage device. The disk 105 is coupled by means of a hub 107 to a shaft 110 connected to a suitable electric motor 115. The motor 115 keeps the disk 105 rotating about the shaft 110 at a constant frequency (for example of between 100 and 150 Hz).

The disk 105 is divided into tracks concentric with the rotation shaft 110, each track containing a plurality of cells for storing one bit of data, represented by different magnetization states of the ferromagnetic material. The density of the data along a track is typically, for example, of the order of 120,000 BPI (bits per inch), and the track density is, for example, of the order of 5,000 TPI (tracks per inch).

The storage device 100 includes a suspension arm 125 coupled at one of its ends to a pin 126. The suspension arm 125 terminates in a flexible suspension 127 on the free end of which a slider 128 is mounted. The slider 128 supports an electromagnetic reading and writing head 130 (described in detail below). The suspension 127 bends in order to exert a pressure which urges the slider 128 against the upper surface of the disk 105. The slider 128 hovers on an air cushion above an upper surface of the disk 105 when the disk 105 is in rotation, allowing the head 130 to follow the roughness of the disk 105 at an extremely small distance, for example of a few tens of nanometers.

An actuator 135, typically constituted by a voice coil motor of the type used in loudspeakers, rotates the suspension arm 125 about the pin 126. The head 130 is thus moved in a substantially radial direction relative to the disk 105 so as to be positioned over the desired track.

The head 130 is connected by means of a flexible wire 143 to an analog/digital circuit 145 formed in a chip of semiconductor material. The circuit 145 processes an electrical signal supplied by the head 130 during a reading operation and sends suitable control signals to the head 130 during a writing operation. The circuit 145 is connected to a control unit 150 which puts the storage device 100 into communication with the exterior. The unit 150 is also connected to the actuator 135 in order to control the positioning of the head 130 over the desired track.

Figure 2:
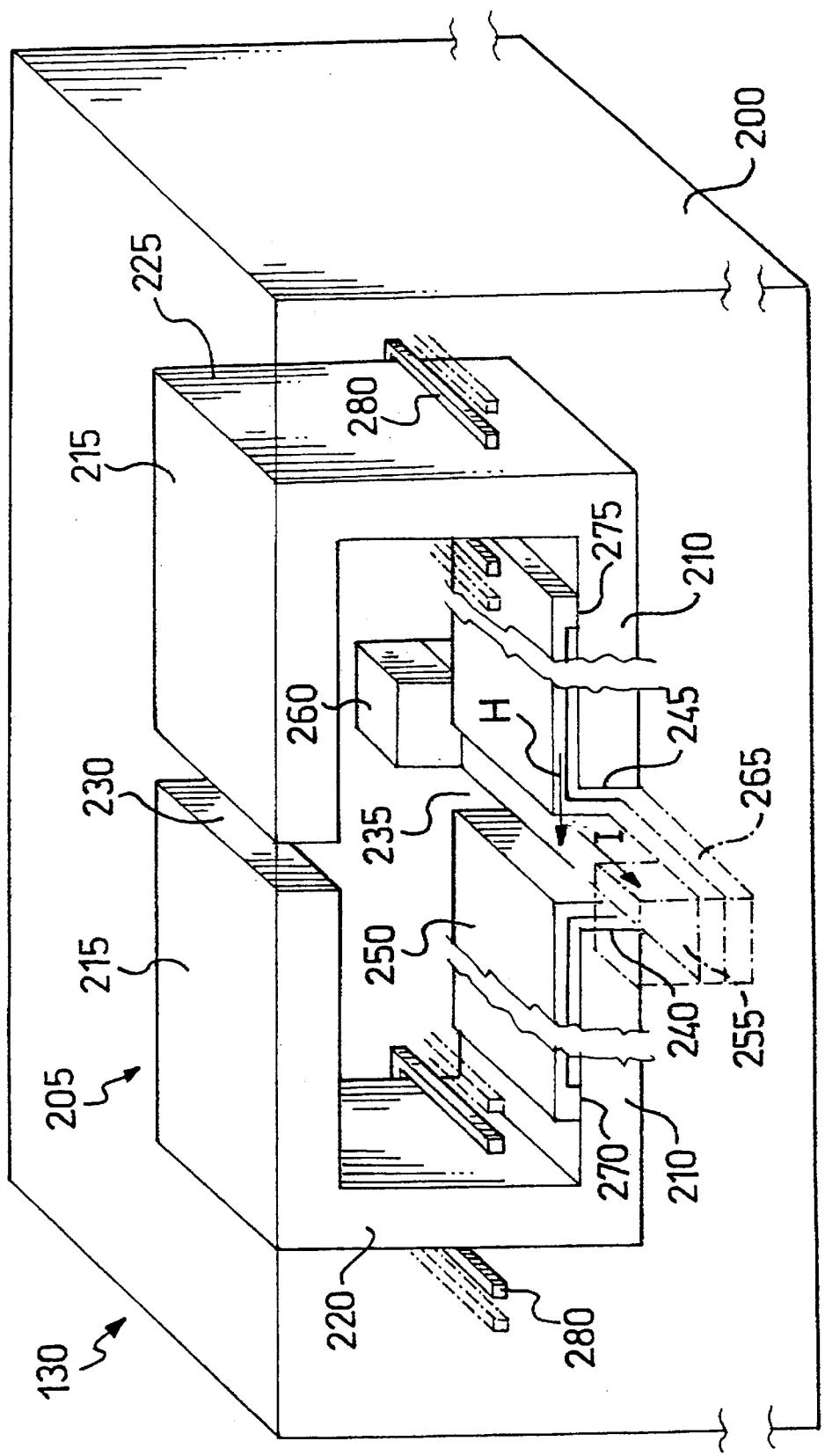
FIG. 2 is a partial view of an embodiment of the electromagnetic head according to the present invention, shown in section.

With reference now to FIG. 2 (the elements already shown in FIG. 1 are identified by the same reference numerals), the electromagnetic head 130 has a planar structure and is formed in a chip of semiconductor material 200, typically silicon. The electromagnetic head of the present invention is, however, also suitable for being formed on a ceramic support or the like. The chip 200 includes a magnetic core 205 made of a soft material with a high permeability, for example permalloy (an alloy of nickel and iron) or other soft ferromagnetic materials with a low magnetostriction coefficient, incorporated in a diamagnetic material, typically silicon dioxide. The core 205 forms a magnetic circuit which defines a preferred path for the flux lines of a magnetic field. Typically, the core 205 is constituted by a lower yoke 210 and by an upper yoke 215 connected by two columns 220 and 225. The upper yoke 215 is interrupted by a first air-gap 230 disposed close to a free upper surface of the chip 200. The first air-gap 230, which has a length equal to the width of the track and a width typically of a few tenths of a micron, enables the magnetic circuit formed by the core 205 to be coupled magnetically with a facing cell of the storage device.

The core 205 is interrupted by a second air-gap 235 which separates a first pole 240 and a second pole 245 of the magnetic core 205. The second air-gap 235 is preferably formed in the lower yoke 210. Alternatively, the second air-gap 235 is formed in a column or in the upper yoke. In the head according to the present invention, a magnetoresistive element 250 used for reading the memory cell (as described in detail below) is connected to the core 205 in correspondence with the first pole 240 and the second pole 245 so as to be connected in the magnetic circuit formed by the core 205.

The magnetoresistive element 250 has a resistance (typically of the order of a few tens of $\omega$) which is variable in dependence on an external magnetic field. In particular, the element 250 is constituted by a transverse magnetoresistor made, for example, of permalloy, which makes use of an anisotropic magnetoresistive effect. A preferred magnetization direction is defined in the magnetoresistor 250 and a measurement current I is made to flow parallel thereto. If the magnetoresistor 250 is simultaneously subjected to a external magnetic field H with a component perpendicular to the direction of the measurement current I, the direction of magnetization rotates towards the direction of the external magnetic field H through an angle depending on the intensity of the external magnetic field. The resistance of the magnetoresistor 250 measured in the direction of the current I decreases as this angle increases, being substantially proportional to the square of its cosine.

A first contact electrode 255 and a second contact electrode 260 (formed, for example, of copper) are connected to the magnetoresistor 250 close to a central body disposed in the air-gap 235. In particular, the electrodes 255 and 260 are positioned transversely relative to the poles 240 and 245; the measurement current I which flows between the electrodes 255 and 260 thus has a direction substantially perpendicular to the magnetic field H in the magnetoresistor 250. In this case, an insulating layer 265 (for example, of silicon dioxide) is disposed between the lower yoke 210 and the magnetoresistor 250 so that the magnetoresistor 250 contacts the lower yoke 210 in two zones 270 and 275. Each contact zone 270, 275 is separated from the corresponding pole tips 240, 245 by a distance (for example, of the order of a few tens of microns) substantially greater than a distance (for example, of a few microns) between the electrodes 255 and 260. In fact, it should be noted that, in parallel with the central body of the magnetoresistor 250 (which is connected directly between the electrodes 255 and 260) there are two resistors defined by a transverse portion of the lower yoke 210 and connected to the electrodes 255, 260 by longitudinal portions of the magnetoresistor 250. Since the length of these longitudinal portions is large, these parallel resistors have a resistance much greater than the resistance of the magnetoresistor 250 to be measured, so that they do not appreciably affect this measurement.

During a reading operation, the magnetic flux generated by the memory cell disposed close to the air-gap 230 is conveyed in the core 205. In the electromagnetic head according to the present invention, this magnetic flux also passes through the magnetoresistor 250, since it is an integral part of the magnetic circuit formed by the core 205. If a certain voltage (for example, of the order of a few millivolts) is applied between the electrodes 255 and 260 and the corresponding current I is measured, it is possible to obtain the intensity of the magnetic field in the magnetoresistor 250, from which the magnetization state of the memory cell can be derived.

Alternatively, two or more magnetoresistors (each disposed in a corresponding air-gap formed in the magnetic core), possibly polarized so that their resistance varies inversely, or a giant magnetoresistor, or a spin valve magnetoresistor may be used. A giant magnetoresistor includes a layer of ferromagnetic material and a layer of conductive material (such as iron and chromium), whereas a spin valve magnetoresistor has a multi-layered structure constituted by at least two layers of ferromagnetic material separated by a layer of non-ferromagnetic material. In this case, the resistance of the magnetoresistive element also varies in dependence on a component of the external magnetic field parallel to the direction of the measurement current so that the contact electrodes are arranged longitudinally without any insulating layer between the magnetoresistor and the magnetic core.

In a preferred embodiment of the present invention, the head 130 also includes a copper coil 280 or other equivalent conductive means. Typically, the coil 280 is wound in a spiral around the columns 220, 225; alternatively, the coil is wound in a spiral around a single column or is wound in a helix around a yoke. The coil 280 generates in the core 205 a magnetic field which is used for writing the memory cell. In particular, during a writing operation, a current of a certain intensity and direction flows in the coil 280. The magnetic flux thus generated is conveyed by the core 205 and is linked with the memory cell disposed close to the air-gap 230 so as to change its magnetization state.

Figure 3A:
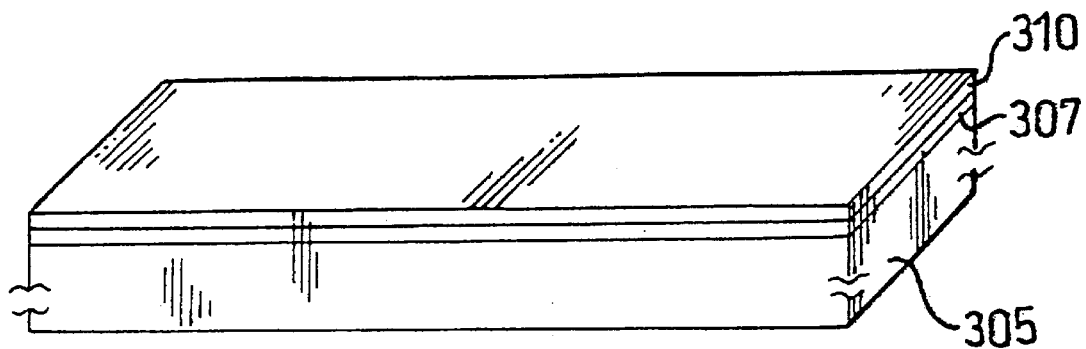
FIGS. 3a–3h show the various steps of a process for producing the head of FIG. 2.
Figure 3B:
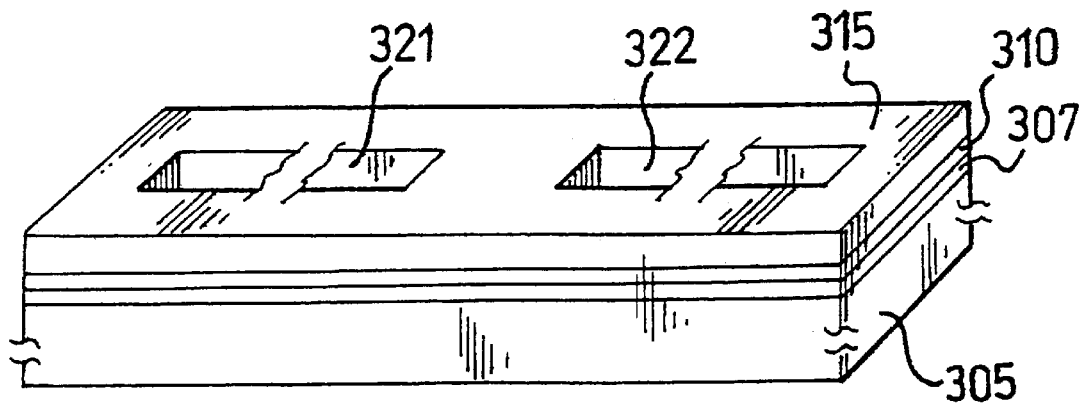
Figure 3C:
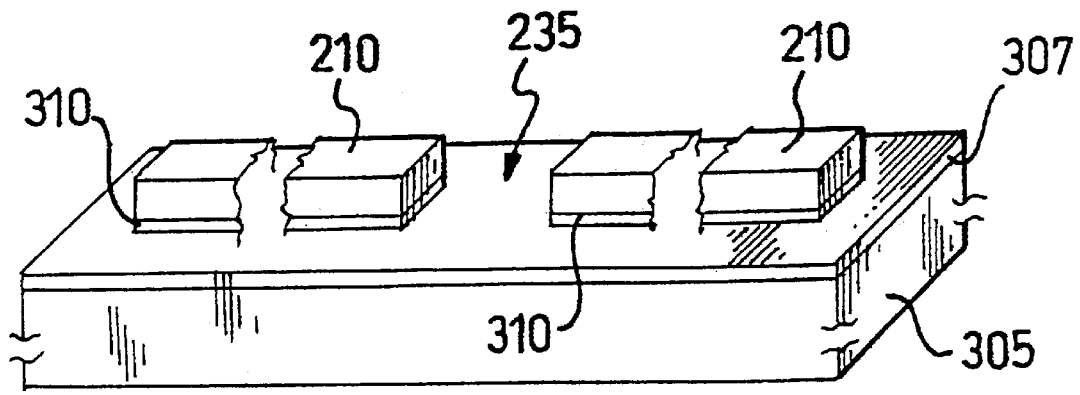

An example of a process for producing the electromagnetic head described above is shown in FIGS. 3a–3h (the elements already shown in FIG. 2 are identified by the same reference numerals). With reference in particular to FIG. 3a, a substrate of semiconductor material 305 (for example, silicon) is covered with a layer of insulating material 307 (typically silicon dioxide). A thin film of conductive material 310 (such as tungsten or chromium) with a thickness, for example, of between 50 and 100 nm, is deposited on the silicon dioxide layer 307, for example, by means of a cathode sputtering process. To go on to FIG. 3b, the conductive film 310 is covered with a layer of light-sensitive (photoresist) material 315. The layer of photoresist material 315 is developed by known masking techniques so as to define two openings 321 and 322 corresponding to the lower yoke (210 in FIG. 2). With reference now to FIG. 3c, a layer of permalloy, for example, with a thickness of between 2 and 3 $\mu$m, is grown by means of an electrolytic process on the portions of the conductive film 310 which are exposed in the regions of the openings 321 and 322. The photoresist material 315 and the conductive film 310 are then removed with the use of the permalloy layer as a mask, by means of anisotropic etching, typically of the ion milling type, so as to form the two portions, separated by the air-gap 235, of the lower yoke 210. Alternatively, the lower yoke 210 and the respective air-gap 235 are formed by a deposition and etching method, or the like.

Figure 3D:
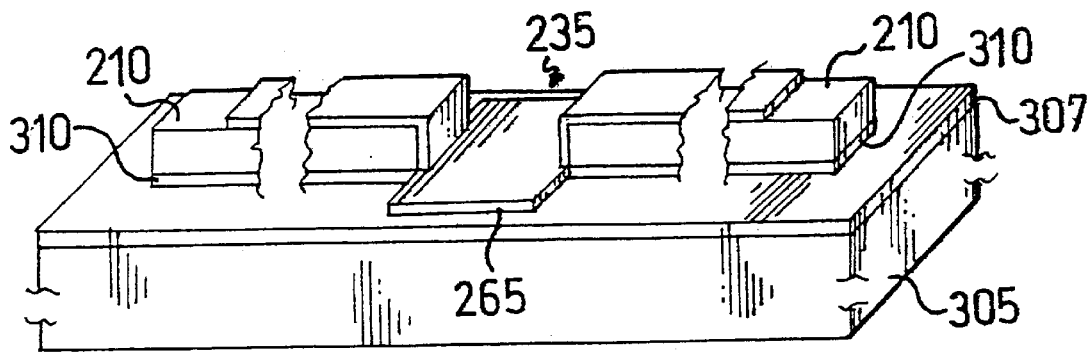
Figure 3E:
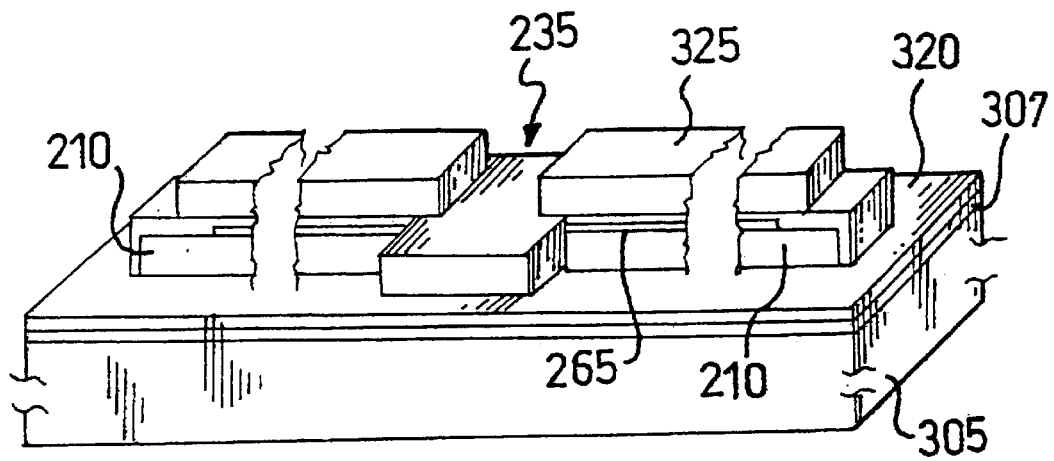
Figure 3F:
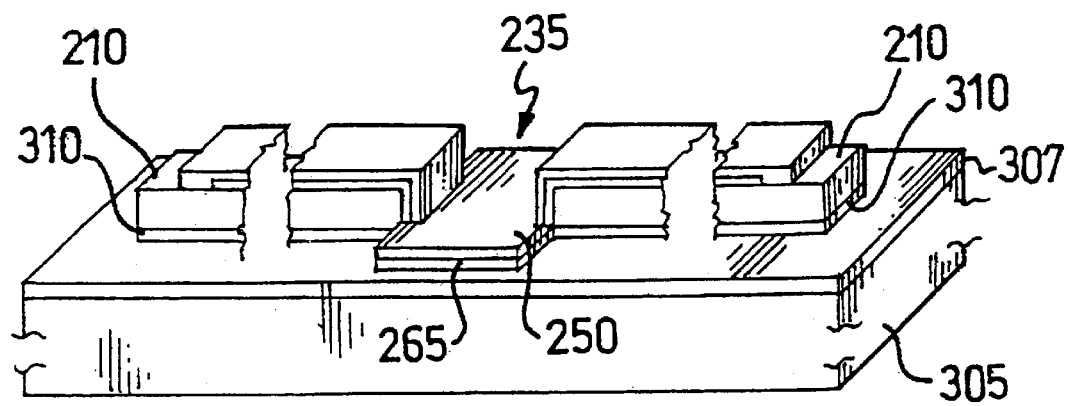

To go on to FIG. 3d, an insulating layer 265 (with a thickness, for example, of between 50 and 100 nm) is formed by known deposition and selective etching techniques. With reference now to FIG. 3e, a film of magnetoresistive material 320 with a thickness, for example, of between 50 and 100 nm, is then deposited. The magnetoresistive film 320 is covered with a layer of photoresist material 325 which is developed by known masking techniques so as to cover only a portion of the magnetoresistive layer 320 corresponding to the magnetoresistor (250 in FIG. 2). As shown in FIG. 3f, the layer of magnetoresistive material 320 is then subjected to anisotropic etching, typically by an ion milling method, with the use of the layer of photoresist material 325 as a mask so as to define the magnetoresistor 250. The layer of photoresist material 325 is then removed (stripped).

Figure 3G:
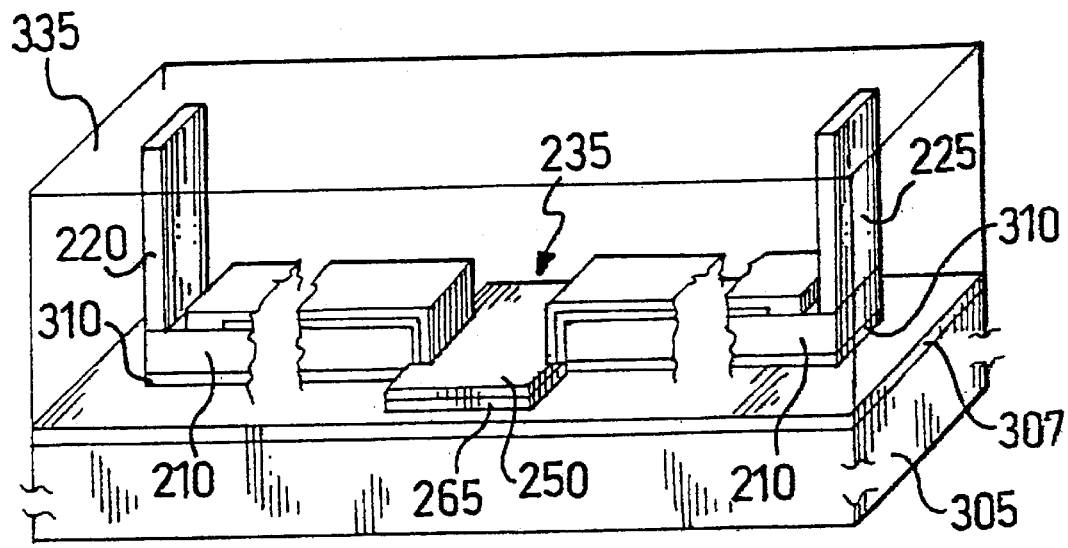
Figure 3H:
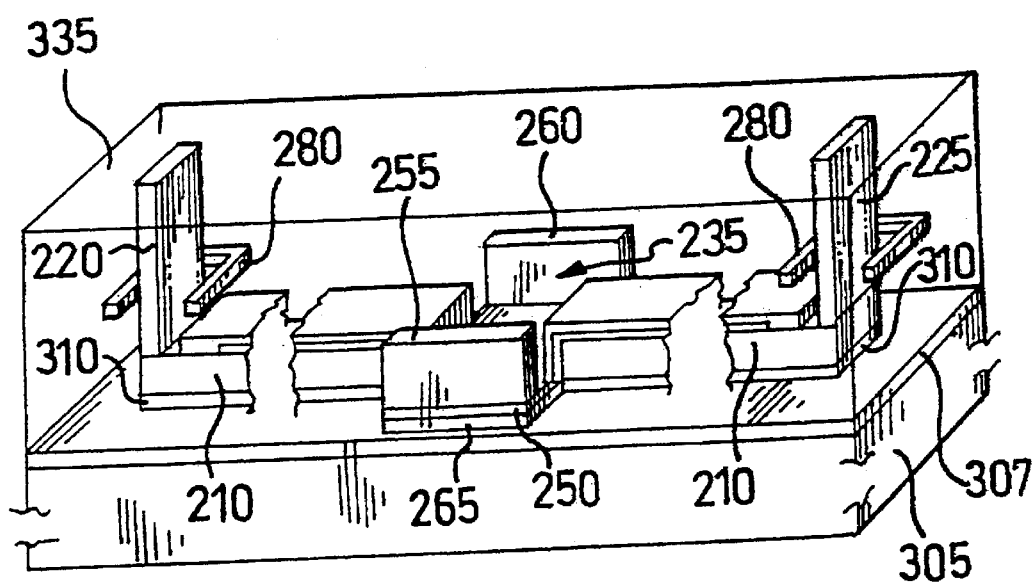

With reference now to FIG. 3g, a layer of insulating material 335 (typically silicon dioxide) with a thickness, for example, of a few microns is deposited. Two openings are formed in the insulating layer 335 by known masking and etching techniques and the permalloy columns 220 and 225 are grown therein, typically by means of an electrolytic process. To go on to FIG. 3h, further openings around the columns 220, 225 and openings for contact with the magnetoresistor 250 used for forming the coil 280 and the electrodes 255, 260, respectively, are formed. It should be noted that the steps illustrated in FIGS. 3g and 3h are generally carried out by the deposition of partial insulation layers in sequence and the formation of corresponding portions of the columns, of the electrodes and of the coil. The insulating layer 335 is then etched in the same manner in order to form openings in which a permalloy layer is deposited and defines the upper yoke (with its air-gap) of the magnetic core, so as to produce the structure shown in FIG. 2.

Naturally, in order to satisfy contingent and specific requirements, a person skilled in the art will be able to apply to the electromagnetic head described above numerous modifications and variations all of which, however, are included within the scope of protection of the invention as defined by the following claims.

What is claimed is:

1. An electromagnetic head for a storage device, comprising a magnetic core forming a magnetic circuit, the magnetic core being interrupted by a first air-gap for magnetic coupling with a memory cell of the device and by at least one second air-gap which separates a first and a second pole of the magnetic core, and magnetoresistive means disposed in the region of the second air-gap for reading the memory cell, wherein the magnetoresistive means are connected to the magnetic core in correspondence with the first pole and the second pole so as to be connected in the magnetic circuit, the magnetoresistive means including a transverse magnetoresistor having a central body disposed in the second air-gap, the head further comprising a first electrode and a second electrode connected to the magnetoresistor in proximity to the second air-gap transversely relative to the magnetic core in order to measure a resistance of the magnetoresistor; and an insulating layer disposed between the magnetoresistor and the magnetic core in a manner such that the magnetoresistor is connected to the magnetic core in the region of a first contact zone and of a second contact zone, the first and second contact zones being separated from the first and second pole tips, respectively, by a distance substantially greater than a distance between the first and second electrodes.

2. A head according to claim 1 wherein the head is formed in a chip of semiconductor material, the first air-gap being disposed close to a free surface of the chip.

3. A head according to claim 1, further comprising conductor means for generating a magnetic field in the core in order to write to the memory cell.

4. A storage device comprising at least one electromagnetic head according to claim 1.

5. A storage device according to claim 4, for comprising a hard disk.

6. An electromagnetic head for reading a memory cell of a storage device, comprising:

a magnetic core forming a magnetic circuit and having a first air-gap for magnetic coupling with the memory cell, the first air-gap separating a first upper yoke and a second upper yoke of the magnetic core, a second air gap separating a first pole and a second pole on a first lower yoke and second lower yoke, respectively;

a magnetoresistive device operatively connected to the magnetic core adjacent to the air-gap in correspondence with the first pole and the second pole so as to be connected in the magnetic circuit; the magnetoresistive device having a transverse magnetoresistor with a central body disposed in the first air-gap, and further comprising a first electrode and a second electrode connected to the magnetoresistor in proximity to the first air-gap, the first and second electrodes being positioned transversely relative to the magnetic core in order to measure a resistance of the magnetoresistor; and the magnetoresistor connected to the magnetic core at a first contact zone and a second contact zone, the first and second contact zones being separated from the first and second pole tips, respectively, by a distance substantially greater than a distance between the first and second electrodes, and further comprising an insulating layer disposed between the magnetoresistor and the magnetic core.

7. The electromagnetic head according to claim 6, further comprising a chip of semiconductor material at least partially disposed about the magnetic core, the first air-gap being disposed close to a free surface of the chip.

8. The electromagnetic head according to claim 6, further comprising a conductor device capable of generating a magnetic field in the magnetic core whereby the memory cell may be written.

* * * * *

UNITED STATES PATENT AND TRADEMARK OFFICE
CERTIFICATE OF CORRECTION

PATENT NO. : 6,134,088
DATED : October 17, 2000
INVENTOR(S) : Bruno Murari et al.

It is certified that error appears in the above-identified patent and that said Letters Patent is hereby corrected as shown below:

Title page,
Item [30], the foreign priority application number should read -- 97830337.8 --.

Claim,
Column 6, claim 5,
Line 20, "for comprising a hard disk" should read -- further comprising a hard disk --.

Signed and Sealed this

Sixth Day of November, 2001

Attest:

*Nicholas P. Godici*

NICHOLAS P. GODICI
*Attesting Officer*   *Acting Director of the United States Patent and Trademark Office*